United States Patent [19]

Hayd

[11] Patent Number: 5,584,772
[45] Date of Patent: Dec. 17, 1996

[54] INFINITELY VARIABLE HYDROSTATIC TORQUE-ROUTING TRANSMISSION

[75] Inventor: Peter Hayd, Heidenheim, Germany

[73] Assignee: J. M. Voith GmbH, Heidenheim, Germany

[21] Appl. No.: 357,712

[22] Filed: Dec. 16, 1994

[30] Foreign Application Priority Data

Dec. 18, 1993 [DE] Germany ............... 43 43 401.0

[51] Int. Cl.$^6$ .................................................. F16H 47/04
[52] U.S. Cl. ................... 475/72; 475/73; 475/76; 475/80
[58] Field of Search ..................... 475/72, 73, 76, 475/78, 80, 81, 82

[56] References Cited

U.S. PATENT DOCUMENTS

| | | | |
|---|---|---|---|
| 4,843,907 | 7/1989 | Hagim et al. | 475/80 |
| 4,895,049 | 1/1990 | Kita et al. | 475/76 |
| 4,976,664 | 12/1990 | Hagim et al. | 475/80 |
| 4,976,665 | 12/1990 | Hagim et al. | 475/80 |
| 4,983,149 | 1/1991 | Kita | 475/78 X |
| 5,337,629 | 8/1994 | Kita | 475/72 X |
| 5,343,779 | 9/1994 | Nikolaus et al. | 475/81 X |
| 5,403,241 | 4/1995 | Jarchow et al. | 475/72 |

FOREIGN PATENT DOCUMENTS

| | | | |
|---|---|---|---|
| 0347594 | 12/1989 | European Pat. Off. | F16H 47/04 |
| 2904572 | 4/1984 | Germany | F16H 47/02 |
| 3925732 | 1/1991 | Germany | F16H 47/02 |
| 4200692 | 7/1993 | Germany | B60K 17/06 |

Primary Examiner—Charles A. Marmor
Assistant Examiner—Peter Kwon
Attorney, Agent, or Firm—Baker & Daniels

[57] ABSTRACT

An infinitely variable hydrostatic torque-routing transmission with at least two operating ranges shiftable via switching elements includes a first, mechanical part, including a planetary differential gear, and a second, hydrostatic part, including two adjustable hydrounits. The hydrounits are coupled to each other energetically, are operable in both directions as pump or motor, and are coupled to the mechanical part. The ring gear is coupled, in the various operating ranges, for control of the direction of rotation and speed of rotation of the transmission output shaft, to a first hydrounit, and with the second hydrounit being in the first operating range in drive connection with the transmission output shaft via an alternating switching element, while the first hydrounit, connected to the ring gear, operates as a pump and the second hydrounit as a motor. The ring gear, by means of a second alternating switching element, can be selectively coupled by way of a first gear drive or a second gear drive to the input or output shaft of the first hydrounit. The first gear drive is structured such that the ring gear and the input or output shaft of the first hydrounit rotate in different directions when the ring gear is coupled to the first hydrounit via the first gear drive. The second gear drive is structured such that the ring gear and the input or output shaft of the hydrounit rotate equidirectionally when the ring gear is coupled to the first hydrounit via the second gear drive.

9 Claims, 6 Drawing Sheets

Operating range 1

Operating range 3

Reverse gear

INFINITELY VARIABLE HYDROSTATIC TORQUE-ROUTING TRANSMISSION

BACKGROUND OF THE INVENTION

The invention concerns an infinitely variable hydromechanical torque-routing transmission with multiple operating ranges selectable via switching elements. Such a transmission includes a first, mechanical part including a planetary differential gear featuring at least two sun wheels of different diameters, a ring gear and an annulus shaft on which there are arranged twin planet wheels (rotationally fixed planet wheels) which are in mesh with the sun wheels. The large sun wheel is coupled to the transmission input shaft, the annulus shaft to the transmission output shaft. Such a transmission also includes a second, hydrostatic part including two energetically coupled adjustable hydrounits which can be operated in both directions as a pump or a motor and are coupled to the mechanical part. The ring gear is coupled, in the various operating ranges, for control of the direction of rotation and speed of rotation of the transmission output shaft, to a first hydrounit. The second hydrounit is in the first operating range in drive connection with the transmission output shaft via an alternating switching element, while the first hydrounit, connected to the ring gear, operates as a pump and the second hydrounit as a motor. In the first and second operating range, the two hydrounits pass through their adjustment ranges between minimum and maximum in opposite directions, trading their functions as they switch from the first to the second operating range and vice versa.

The infinitely variable hydromechanical torque-routing transmission—hereafter briefly referred to as a SHL gearbox—is known from DE 29 04 572 and features in its hydrostatic part hydrounits capable of one-sided tilt. Performing system-specific rotational speed reversals of individual hydrounits in the various operating ranges, in braking and in reverse gear, requires in the various operating ranges a switching of flow direction in the hydrounits, which is accomplished by means of an expensive control block. The disadvantage of using a control block of this type primarily consists of the problem-prone ducting, the low structural fatigue strength and the limited options in equipping it with hydraulic control organs, as well as very high cost. Furthermore, the external dimensions of this control block are determined by the maximum volume flow of the hydrounits, the associated dimensions of installation valves, the ducting and allowable material stress, precluding an integration in a compact transmission. Moreover, the weight of the transmission is considerably increased by the control block.

The problem underlying the invention consists of advancing an SHL gearbox of the initially mentioned type in such a way that the cited disadvantages will be avoided, while at the same time attempting to obtain a minimization of the control and regulating expense.

SUMMARY OF THE INVENTION

Inventionally provided in a known gearbox described in the background is a reversing gearset comprised of two gear drives which in gear ratio differ at least by their mathematical sign. By means of a second, alternating switching element, the ring gear can be selectively coupled through a first gear drive or a second gear drive to the input or output shaft of the first hydrounit. The structure of the first gear drive is such that the ring gear and input or output shaft of the first hydrounit will rotate in different directions when the ring gear is coupled through the first gear drive to the first hydrounit. The structure of the second gear drive is such that the ring gear and input or output shaft of the hydrounit rotate equidirectionally when the ring gear is coupled through the second gear drive to the first hydrounit. Employment of a reversing gearset of such a design allows a rotational speed reversal of the first hydrounit, and the SHL-specific flow reversals can be established in a simple manner at low expense.

The expensive control block which in the embodiment according to the prior art is required in the high-pressure range is dispensable. The hydrostatic coupling of the hydrounit is accomplished through a linkage block of simple design featuring means for introducing the leakage oil quantity and for limitation of the maximum pressure. This linkage block is characterized by a simple structure, small size and simple ducting. The latter engenders a considerable reduction of flow losses as compared to the prior art design, and thus an appreciable improvement of the overall efficiency of the transmission.

BRIEF DESCRIPTION OF THE DRAWINGS

The invention will be more fully explained with the aid of the figures, wherein.

DETAILED DESCRIPTION OF THE INVENTION

Figure 1:
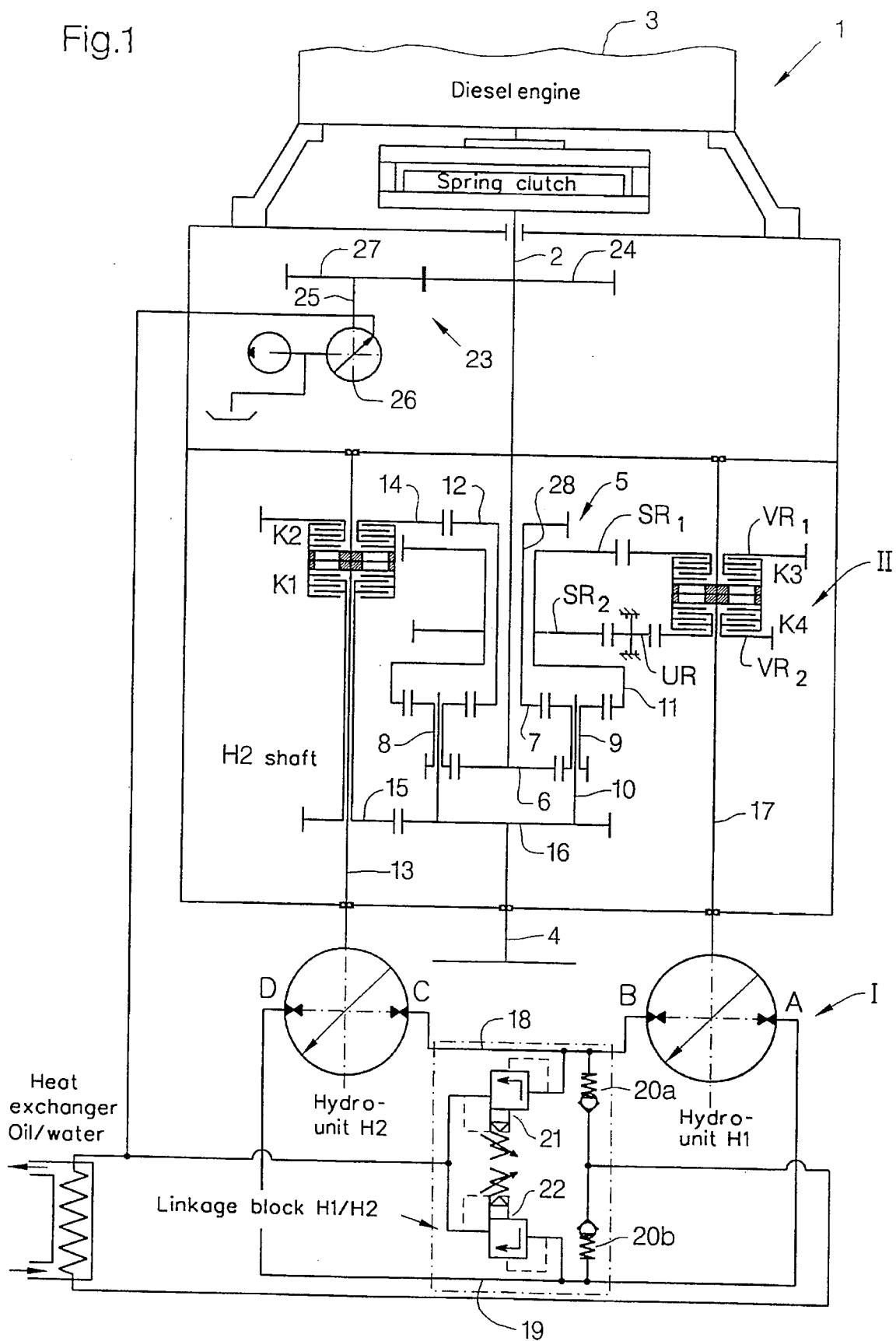
FIG. 1 is an embodiment of the inventional infinitely variable hydrostatic torque-routing transmission with integrated reversing gearset in the mechanical part of the transmission.

Illustrated in FIG. 1 is an embodiment of an inventional infinitely variable hydrostatic torque-routing transmission. Referenced 1 overall, the torque-routing transmission is composed of a hydrostatic transmission part I, which comprises two hydrounits H1 and H2 operable as pump and motor, and a mechanical transmission part II. An engine 3 is connected on the side of the transmission input shaft 2. An output shaft of the torque-routing transmission 1 is referenced 4. Arranged between transmission input shaft 2 and transmission output shaft 4 is a planet differential gear 5 which includes a large sun wheel 6, a small sun wheel 7, twin planet wheels 8 and 9, an annulus shaft 10 and a ring gear 11. The large sun wheel 6 is fixed to the transmission input shaft 2. The small sun wheel 7 is fixed to a hollow shaft 28 on which, in turn, a gear 12 is fixed. Gear 12 meshes with a gear 14 rotatably arranged on a shaft 13. Shaft 13 establishes the mechanical connection between hydrounit H2 and the planetary differential gear 5. Also rotatably arranged on shaft 13 is a gear 15 meshing with a gear 16, which is fixed to the transmission output shaft 4. A clutch K1 allows locking of gear 15 to the shaft 13, while a clutch K2 allows locking of gear 14 to the shaft 13.

A spur gear $SR_1$ and a spur gear $SR_2$ are fixed on ring gear 11. Spur gear $SR_1$ meshes with a speed reducer gear $VR_1$, and the spur gear $SR_2$, via a reversing gear UR, meshes with a reducer gear $VR_2$. Both reducer gears $VR_1$ and $VR_2$ can be selectively coupled by clutches K3 and K4 to a shaft 17 acting as an input or output shaft of hydrounit H1.

Hydrounits H1 and H2 are interconnected by lines 18 and 19. The hydrostatic coupling of hydrounit H1 to H2 is effected by a linkage block H1/H2 which includes two check valves 20a and 20b for introduction of the leakage oil quantity and two pressure relief valves 21 and 22 for limitation to maximum pressure.

The hydrounits are supplied with oil by a feed pump 26 driven by the engine 3 via a spur gear stage 23 comprising a spur gear 24 that is fixed to the transmission input shaft and that meshes with spur gear 27, which is fixed to the drive shaft 25 of feed pump 26.

The speed of rotation of the transmission output shaft 4 equals the sum of rotational speeds of the large sun wheel 6 and ring gear 11, which determine the speed of rotation of planet wheels 8 and 9, respectively of annulus shaft 10.

Figure 2:
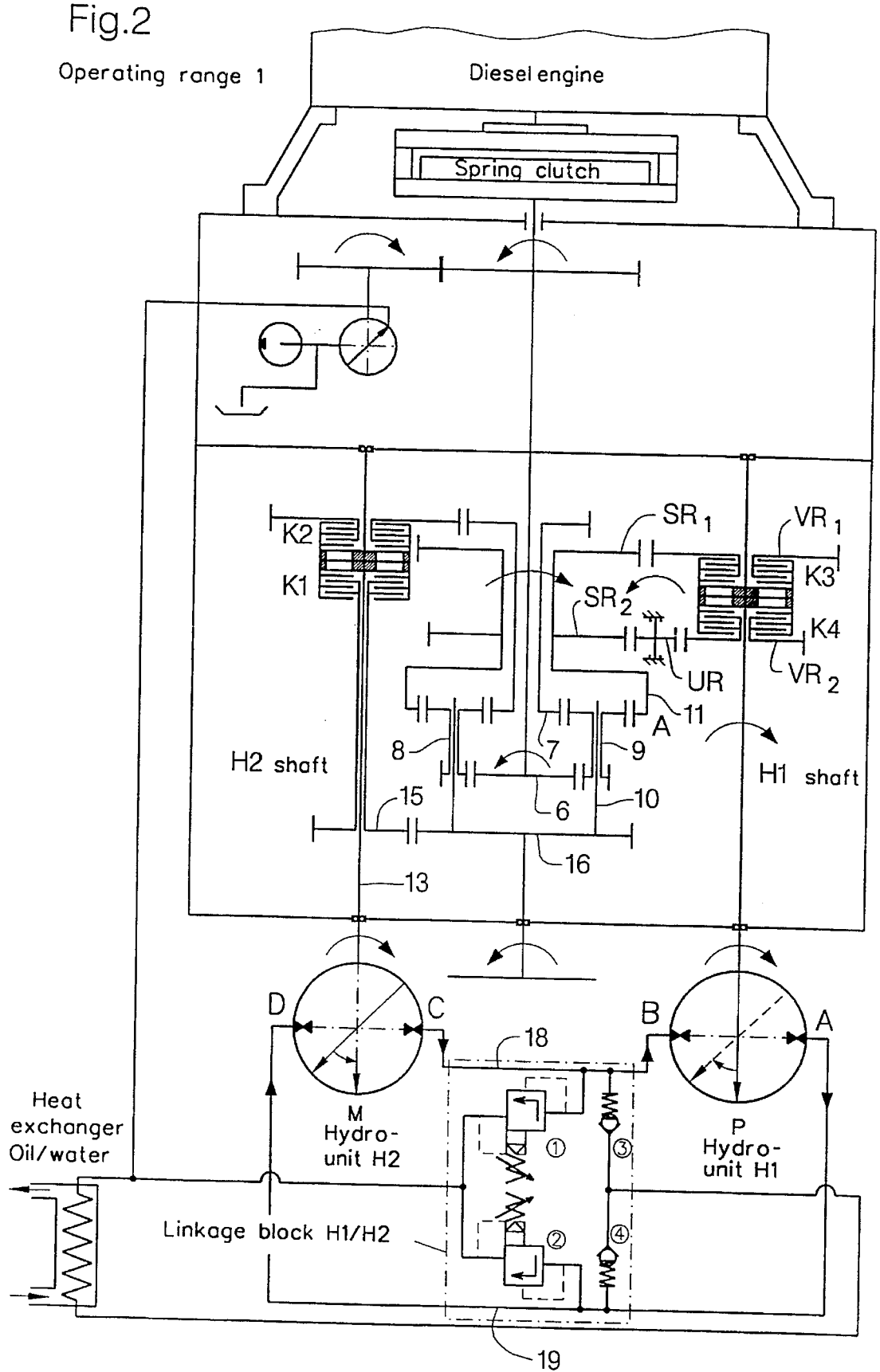
FIG. 2 is an infinitely variable hydrostatic torque-routing transmission according to FIG. 1, also showing the direction of rotation and mode of operation of the individual hydrounits and elements of the mechanical transmission part in the first operating range.

FIG. 2 serves to illustrate the mode of operation of the infinitely variable hydrostatic torque-routing transmission of FIG. 1 in the first operating range, that is, in start-up range. Clutches K1 and K4 are engaged. The flow of force proceeds from engine 3 via the large sun wheel 6 to the twin planet wheels 8 and 9, through ring gear 11 onto spur gear $SR_2$, and to the reversing gear UR and the reducer gear $VR_2$, which by way of clutch K4 is locked to shaft 17. Shaft 17 acts a drive shaft of the hydrounit H1. In the start-up range, the latter operates in the start-up range as pump P and swings out to the maximum tilt angle. Ring gear 11 and sun wheel 6 differ in the direction of rotation.

The power received from hydrounit H1 acting as pump P is transmitted, with deduction of the operational losses, to the hydrounit H2 operated as motor M. Here, connecting line 19 is the working line, while connecting line 18 acts as the low-pressure line. Hydrounit H2 powers the gear 15, which by way of clutch K1 is locked to junction shaft 13. In turn, gear 15 meshes with gear 16, which is fixed to the transmission output shaft.

At the beginning of the start-up procedure, the hydrounit H2 operated as motor M is adjusted to maximum displacement volume. Hydrounit H1 swings out to maximum tilt angle. Annulus 10 is at standstill. Hydrounit H2 then swings back to zero position, that is, hydrounit H2 picks up no more torque, for which reason the speed of rotation of the input shaft of hydrounit H1 drops gradually as well to zero. Therefore, the speed of rotation of the ring gear is approximately zero at the end of the start-up range. Small sun wheel 7 and annulus 10 rotate equidirectionally. The entire power is transmitted mechanically. At this juncture, switching occurs to the second operating range. Clutch K1 disengages and clutch K2 engages. Since hydrounit H2 picks up no torque in zero position, the switched torque is about 0 Nm. Then follows the switching from K4 to K3. The speeds of rotation of the two clutches are approximately zero.

Figure 3:
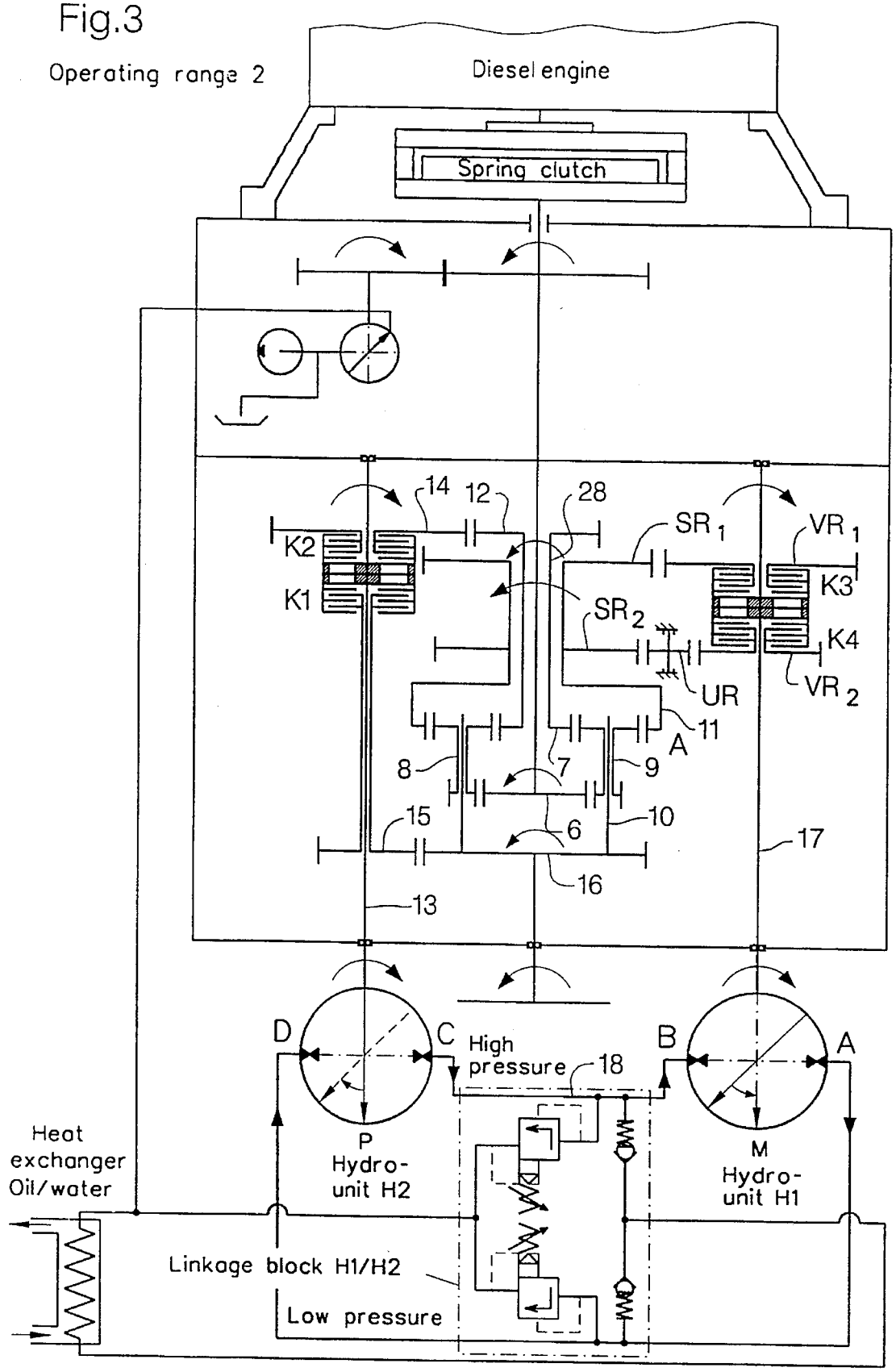
FIG. 3 is an infinitely variable hydrostatic torque-routing transmission according to FIG. 1, also showing the direction and rotation and mode of operation of the individual hydrounits and elements of the mechanical transmission part in the second operating range.

FIG. 3 illustrates the direction of rotation of the various elements of the SHL gearbox, described in FIG. 1, in the second operating range. Clutches K2 and K3 are engaged; hydrounit H1 operates as motor M, and hydrounit H2 as pump P; the working line is connecting line 18. At the start of the second operating range, hydrounit H1 still is adjusted to maximum tilt angle, while that of hydrounit H2 is zero.

Engagement of clutch K2 locks the drive shaft 13 of hydrounit H2 to the spur gear 14, which meshes with spur gear 12, the latter being fixed to the same hollow shaft 28 as the small sun wheel 7. The small sun wheel 7 is driven via the large sun wheel 6 and twin planet wheels 8 and 9. Ring gear 11 is at standstill. The small sun wheel 7 and the large sun wheel 6 rotate equidirectionally. As the tilt angle of hydrounit H2 increases, the share of power transmitted hydraulically rises. The power is transmitted to the transmission output shaft 4 by coupling the output shaft 17 of hydrounit H1 to the ring gear 11 and by way of annulus 10. The coupling is effected by engaging the clutch K3, locking output shaft 17 to the first reducer gear $VR_1$, which meshes with the first spur gear $SR_1$ which, in turn, is fixed to the ring gear 11. The directions of rotation of ring gear 11 and large sun wheel 6 as well as small sun wheel 7, and consequently also the direction of rotation of annulus 10, are the same until reaching the maximum tilt angle of the pump.

As the maximum tilt angle of hydrounit H2 is reached, hydrounit H1 swings back. The share of hydraulically transmitted power again diminishes, since hydrounit H1 picks up an ever smaller moment as its tilt angle decreases. Consequently, the speed of rotation of hydrounit H2 declines to zero toward the end of the second operating range. The speed of rotation of the small sun wheel 7 decreases thus as well to zero. At this point, switching to the third operating range occurs. Clutch K3 disengages and clutch K4 engages.

Figure 4:
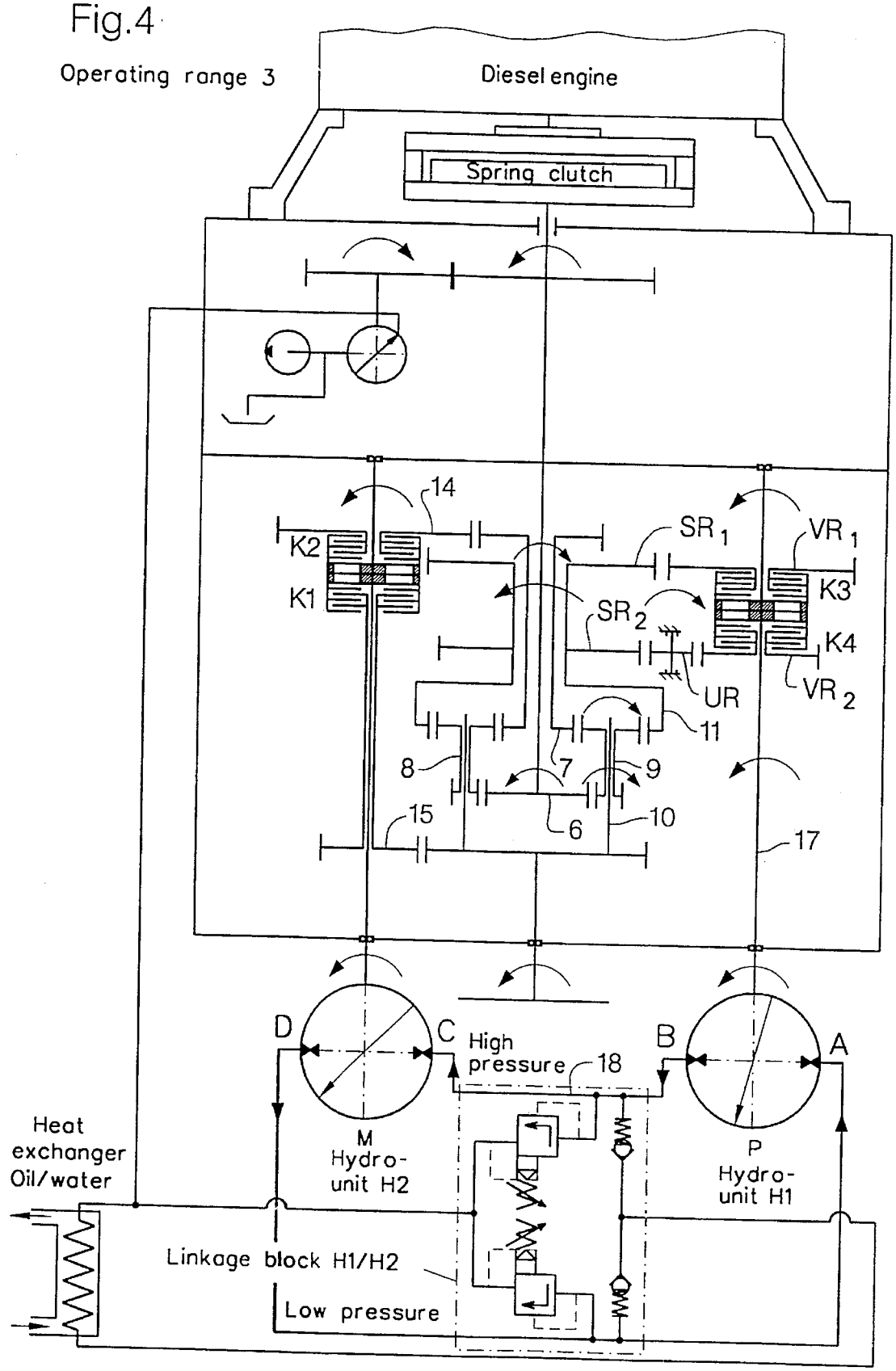
FIG. 4 is an infinitely variable hydrostatic torque-routing transmission according to FIG. 1, also showing the direction of rotation and mode of operation of the individual hydrounits and elements of the mechanical transmission part in the third operating range.

FIG. 4 illustrates the operating mode of the infinitely variable hydrostatic torque-routing transmission relative to FIG. 1 in the third operating range. The function of the hydrounits is traded again as compared to the second operating range. Hydrounit H1 operates clockwise as pump P, hydrounit H2 as motor M. Hydrounit H2 remains swung out.

Hydrounit H1 is driven via the large sun wheel 6, twin planet carrier 8 and 9, spur gear $SR_2$, reversing gear UR, speed reducer gear $VR_2$, and shaft 17. Hydrounit H1 is tilted from zero to about 15%. The power picked up by hydrounit H1 operating as pump P is transmitted, under deduction of operating losses, to the hydrounit H2 operating as motor M. The connecting line 18 acts as the operating, or high-pressure, line. Adjusted to maximum displacement volume, hydrounit H2 picks up about 26% of the input power. Shaft 13 acts here as the output shaft of hydrounit H2 and drives the small sun wheel 7 via the spur gear 14, which by means of clutch K2 is locked to shaft 13. Small sun wheel 7 and ring gear 11 rotate in different directions. The speed of rotation of transmission output shaft 4 results from the differences in speed of rotation between the small sun wheel and ring gear 11.

In the third operating range, the hydrounit H2 operated as motor M is at full tilt over the entire operating range. Due to the increased tilt angle of hydrounit H1, the moment transmitted by hydrounit H1 to hydrounit H2 increases, and the share of hydraulically transmitted power rises again in this operating range.

Figure 5:
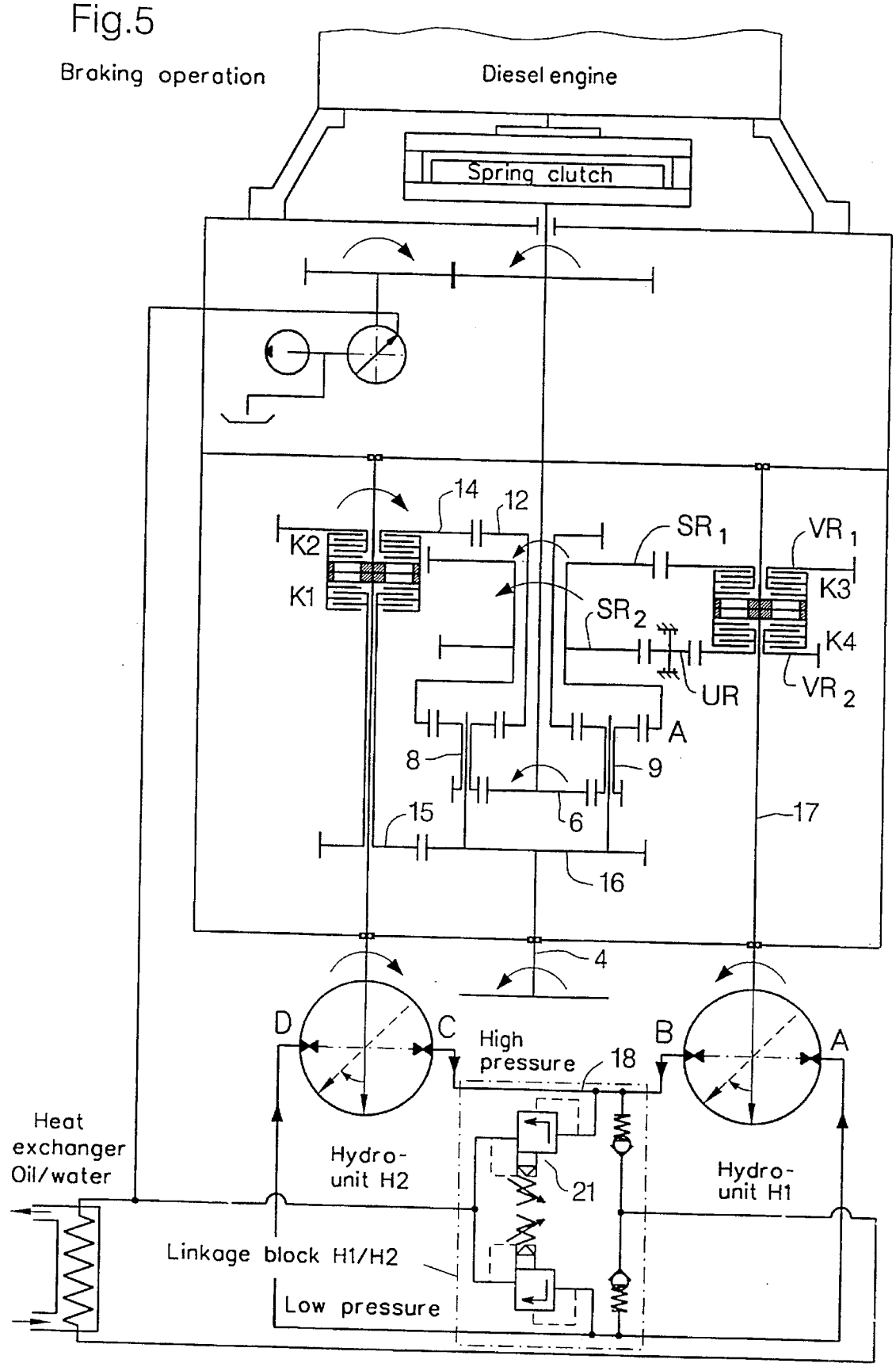
FIG. 5 is an infinitely variable hydrostatic torque-routing transmission according to FIG. 1, also showing the direction of rotation and mode of operation of the individual hydrounits and elements of the mechanical transmission part in reverse operation.

FIG. 5 illustrates the operating modes of the SHL gearbox relative to FIG. 1 in braking operation. Actuation of the brake pedal causes both hydrostatic units H1 and H2 to tilt to the effect that both will operate as pump P and counteract each other. To that end, hydrostatic unit H1 swings first from its present position of tilt toward the zero position. H1 remains inclined preferably about 5° and then swings, with lead, to the maximum tilt angle while H2, trailing, swings to 45% of maximum tilt angle. Both hydrounits operate as pump P in the same line 18 (high-pressure line), and the pressure relief valve 21, which opens in response to exceeding the adjusted maximum allowable pressure value, converts the pressure energy to heat.

Braking operation can be activated from the second and third operating range. The pump adjustment device is activated as a function of the desired braking moment, for instance in response to the brake pedal angle and the duration of brake pedal actuation.

Clutches K2 and K4 have been switched and connect in this case the drive shaft 13 of hydrostatic unit H2 via gear stage 14/12, which is driven via twin planet wheels 8 and 9 by the large sun wheel 6, which is coupled to the transmission input shaft 2. Hydrounit H1 is being driven by shaft 17.

Figure 6:
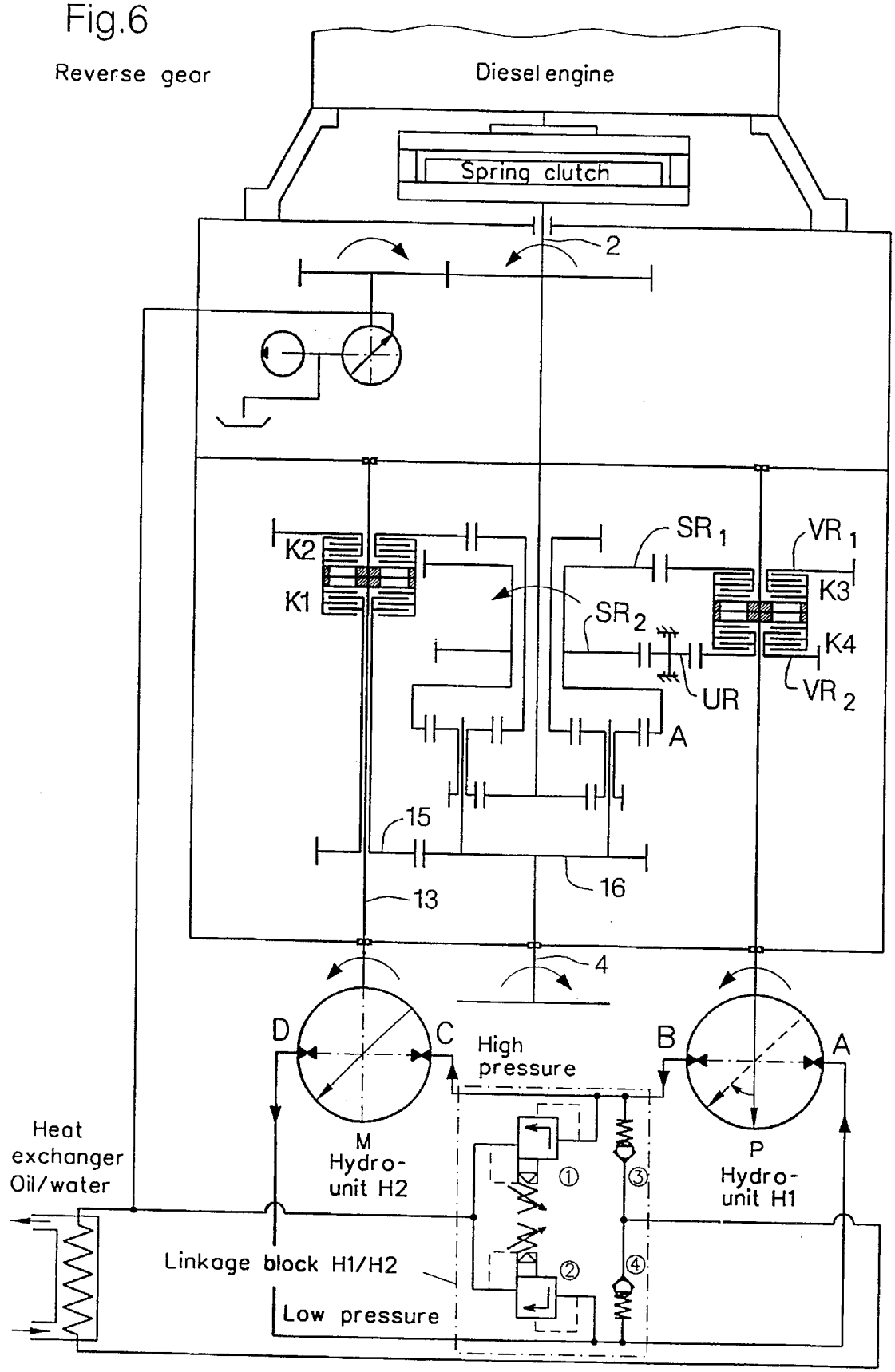
FIG. 6 is an infinitely variable hydrostatic torque-routing transmission according to FIG. 1, also showing the direction of rotation and mode of operation of the individual hydrounits and elements of the mechanical transmission part in braking operation.

FIG. 6 illustrates the operating mode of the SHL gearbox relative to FIG. 1 in reverse gear. Clutches K1 and K3 are engaged for that purpose. Hydrostatic unit H1 is operated as pump P, and hydrostatic unit H2 is operated as motor M. Output shaft 13 of hydrounit H2 powers the transmission output shaft 4 counterclockwise, i.e., in the opposite direction of rotation of transmission input shaft 2, via gear stage 15/16.

The change in tilt angle of the hydrounits and, associated with it, change of displacement volume can be effected mechanically, electrohydraulically or also electromechanically. Systems and elements of the control and regulating technology are used to determine the point in time and magnitude of tilt angle change.

What is claimed is:

1. An infinitely variable hydrostatic torque-routing transmission with at least two operating ranges selectable via switching elements, the at least two operating ranges including a first operating range and a second operating range, the transmission comprising:

a transmission input shaft;

a transmission output shaft;

a first alternating switching element;

a mechanical part comprising a planetary differential gear including at least two sun wheels of different diameters, a ring gear, and an annulus shaft, wherein said at least two sun wheels include a first sun wheel and a second sun wheel, wherein the diameter of said first sun wheel is larger than the diameter of said second sun wheel, wherein said planetary differential gear further comprises twin rotationally fixed planet wheels arranged on said annulus shaft and in mesh with said first and second sun wheels, said first sun wheel being coupled to said transmission input shaft, said annulus shaft being coupled to said transmission output shaft;

a hydrostatic part comprising first and second energetically coupled adjustable hydrounits, said hydrounits coupled to said mechanical part and operable in both directions as a pump or a motor, said first hydrounit comprising a shaft functional as an input shaft or an output shaft;

wherein in the at least two operating ranges, said ring gear is coupled to said first hydrounit for control of a direction of rotation and a speed of rotation of said transmission output shaft;

wherein in the first operating range, said second hydrounit is in drive connection with said transmission output shaft via said first alternating switching element and operates as the motor while said first hydrounit is connected to said ring gear and operates as the pump;

wherein in the first and second operating ranges, said first and second hydrounits pass through adjustment ranges between minimum and maximum in opposite directions and trade their pump and motor functions during switching from the first to the second operating range and during switching from the second to the first operating range;

a first gear drive;

a second gear drive;

a second alternate switching element for selectively coupling said ring gear to said first hydrounit shaft through said first gear drive or through said second gear drive;

said first gear drive structured such that said ring gear and said first hydrounit shaft rotate in different directions when said ring gear is coupled to said first hydrounit through said first gear drive; and wherein said second gear drive is structured such that said ring gear and said first hydrounit shaft rotate equidirectionally when said ring gear is coupled to said first hydrounit through said second gear drive.

2. The infinitely variable hydrostatic torque-routing transmission of claim 1 wherein a gear ratio of said first gear drive and a gear ratio of said second gear drive are the same.

3. The infinitely variable hydrostatic torque-routing transmission of claim 1 wherein said first gear drive comprises a first spur gear and a first speed reducer gear meshing with said first spur gear, wherein said first spur gear is fixed to said ring gear, wherein said first speed reducer gear is coupleable to said first hydrounit shaft, wherein said second gear drive comprises a second spur gear, a second speed reducer gear, and an intermediate gear coupling said second spur gear to said second speed reducer gear, wherein said second spur gear is fixed to said ring gear and wherein said second speed reducer gear is coupleable to said first hydrounit shaft.

4. The infinitely variable hydrostatic torque-routing transmission of claim 2 wherein said first gear drive comprises a first spur gear and a first speed reducer gear meshing with said first spur gear, wherein said first spur gear is fixed to said ring gear, wherein said first speed reducer gear is coupleable to said first hydrounit shaft, wherein said second gear drive comprises a second spur gear, a second speed reducer gear, and an intermediate gear coupling said second spur gear to said second speed reducer gear, wherein said second spur gear is fixed to said ring gear and wherein said second speed reducer gear is coupleable to said first hydrounit shaft.

5. The infinitely variable hydrostatic torque-routing transmission of claim 1 wherein said first and second hydrounits are hydrostatically coupled by a linkage block comprising two check valves and two pressure relief valves.

6. The infinitely variable hydrostatic torque-routing transmission of claim 2 wherein said first and second hydrounits are hydrostatically coupled by a linkage block comprising two check valves and two pressure relief valves.

7. The infinitely variable hydrostatic torque-routing transmission of claim 3 wherein said first and second hydrounits are hydrostatically coupled by a linkage block comprising two check valves and two pressure relief valves.

8. The infinitely variable hydrostatic torque-routing transmission of claim 4 wherein said first and second hydrounits are hydrostatically coupled by a linkage block comprising two check valves and two pressure relief valves.

9. An infinitely variable hydrostatic torque-routing transmission with at least two operating ranges selectable via switching elements, the transmission comprising;

a first, mechanical part comprising a planetary differential gear featuring at least two sun wheels of different diameters, a ring gear and an annulus shaft on which there are arranged twin rotationally fixed planet wheels which are in mesh with the sun wheels, the large sun wheel being coupled to a transmission input shaft, the annulus shaft to a transmission output shaft;

a second, hydrostatic part comprising two energetically coupled adjustable hydrounits which can be operated in both directions as pump or motor and are coupled to the mechanical part;

wherein the ring gear is coupled, in the various operating ranges, for control of the direction of rotation and speed of rotation of the transmission output shaft, to a first hydrounit;

wherein a second hydrounit is in a first operating range in drive connection with the transmission output shaft via an alternating switching element, while the first hydrounit, connected to the ring gear, operates as a pump and the second hydrounit as a motor;

wherein in the first and second operating range, the two hydrounits pass through their adjustment ranges between minimum and maximum in opposite directions, trading their functions as they switch from the first to the second operating range and vice versa;

wherein the ring gear can be coupled, by means of a second alternate switching element, selectively by way of a first gear drive or a second gear drive, to an input or output shaft of the first hydrounit;

wherein the first gear drive is structured in a way such that, with the ring gear coupled to the first hydrounit via the first gear drive, the ring gear and the input or output shaft of the first hydrounit rotate in different directions; and wherein the second gear drive is structured such that, when coupled to the first hydrounit, the ring gear and the input or output shaft of the hydrounit rotate equidirectionally.

* * * * *